United States Patent
Liu et al.

(10) Patent No.: US 12,323,989 B2
(45) Date of Patent: *Jun. 3, 2025

(54) CONTROL INFORMATION OBTAINING METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,806

(22) Filed: Jan. 3, 2022

(65) Prior Publication Data

US 2022/0210772 A1    Jun. 30, 2022

Related U.S. Application Data

(63) Continuation of application No. 16/668,939, filed on Oct. 30, 2019, now Pat. No. 11,240,793, which is a (Continued)

(30) Foreign Application Priority Data

May 5, 2017    (CN) .......................... 201710313617.2

(51) Int. Cl.
*H04W 72/23*    (2023.01)
*H04L 5/00*     (2006.01)
(Continued)

(52) U.S. Cl.
CPC .......... *H04W 72/23* (2023.01); *H04L 5/0007* (2013.01); *H04W 72/30* (2023.01); *H04W 76/27* (2018.02);
(Continued)

(58) Field of Classification Search
None
See application file for complete search history.

(56) References Cited

U.S. PATENT DOCUMENTS 8,913,672 B2   12/2014 Luo et al.
11,206,120 B2 * 12/2021 Chen Larsson ..... H04L 27/2646
(Continued)

FOREIGN PATENT DOCUMENTS

CN    102301816    12/2011
CN    102550108     7/2012
(Continued)

OTHER PUBLICATIONS

3GPP TS 38.331 V0.0.1 (Mar. 2017), 3rd Generation Partnership Project, Technical Specification Group Radio Access Network, NR, Radio Resource Control (RRC), Protocol specification(Release 15), 13 pages.

(Continued)

*Primary Examiner* — Anh Vu H Ly
(74) *Attorney, Agent, or Firm* — Fish & Richardson P.C.

(57) ABSTRACT

The present disclosure relates to control information sending methods in a wireless communications system. In one example waveform control information sending method, a network device obtains control information that includes uplink transmission waveform indication information, and sends the control information to a terminal. After receiving the control information, the terminal determines, based on the control information, a waveform used to send uplink data.

20 Claims, 6 Drawing Sheets

Related U.S. Application Data continuation of application No. PCT/CN2018/085091, filed on Apr. 28, 2018.

(51) Int. Cl.
| | |
|---|---|
| *H04W 72/30* | (2023.01) |
| *H04W 76/27* | (2018.01) |
| *H04L 27/26* | (2006.01) |
| *H04W 72/044* | (2023.01) |

(52) U.S. Cl.
CPC ....... *H04L 27/2636* (2013.01); *H04W 72/044* (2013.01)

(56) References Cited

U.S. PATENT DOCUMENTS

| | | | |
|---|---|---|---|
| 11,240,793 B2* | 2/2022 | Liu | H04L 27/2646 |
| 2010/0202389 A1 | 8/2010 | Cai et al. | |
| 2011/0085513 A1 | 4/2011 | Chen et al. | |
| 2011/0305179 A1 | 12/2011 | Wang et al. | |
| 2012/0120885 A1 | 5/2012 | Wang et al. | |
| 2012/0163305 A1 | 6/2012 | Nimbalker et al. | |
| 2012/0176884 A1 | 7/2012 | Zhang et al. | |
| 2013/0039290 A1 | 2/2013 | Harrison et al. | |
| 2015/0173079 A1* | 6/2015 | Yokomakura | H04L 5/001 370/329 |
| 2017/0311296 A1 | 10/2017 | Onggosanusi et al. | |
| 2018/0124710 A1* | 5/2018 | Ly | H04W 52/146 |
| 2018/0288746 A1 | 10/2018 | Zhang et al. | |
| 2018/0294916 A1* | 10/2018 | Akkarakaran | H04W 72/23 |
| 2019/0260623 A1* | 8/2019 | Li | H04L 27/2627 |
| 2019/0274158 A1 | 9/2019 | Tang et al. | |
| 2020/0059905 A1 | 2/2020 | Tang | |
| 2020/0068624 A1 | 2/2020 | Xu et al. | |
| 2020/0162225 A1 | 5/2020 | Larsson et al. | |
| 2020/0244503 A1 | 7/2020 | Bala et al. | |
| 2021/0105164 A1* | 4/2021 | Nakamura | H04L 27/2607 |

FOREIGN PATENT DOCUMENTS

| | | |
|---|---|---|
| CN | 103039120 | 4/2013 |
| CN | 103098532 | 5/2013 |
| CN | 103283283 | 9/2013 |
| CN | 103875259 | 6/2014 |
| CN | 106549889 A | 3/2017 |
| EP | 3554188 | 10/2019 |
| IN | 201917027654 | 9/2019 |
| WO | 2016171765 A1 | 10/2016 |

OTHER PUBLICATIONS

Extended European Search Report issued in European Application No. 18794119.0 on Feb. 25, 2020, 9 pages.
Guangdong OPPO Mobile Telecom,"Discussion on uplink power control for NR",3GPPTSG RAN WG1 Meeting #88bis, R1-1704613, Spokane, USA, Apr. 3-7, 2017, 2 pages.
Office Action issued in Chinese Application No. 201810691780.7 on Mar. 22, 2019, Jul. 13, 2018, 17 pages (With English Translation).
Office Action issued in Indian Application No. 201917042920 on May 11, 2021, 6 pages.
PCT International Search Report and Written Opinion in International Application No. PCT/CN2018/085,091, dated Jul. 13, 2018, 15 pages (With English Translation).
Qualcomm et al.,"WF on Waveform for NR Uplink", 3GPP TSG RAN WG1 #86-Bis, R1-1610485, Lisbon, Portugal, Oct. 10-14, 2016, 6 pages.
Qualcomm Incorporated,"UL waveform configuration",3GPP TSG-RAN WG1 #87 , R1-1612075, Reno, USA, Nov. 14-18, 2016, 6 pages.
1 Office Action issued in Chinese Application No. 201710313617.2 on Jun. 29, 2022, 7 pages.
Qualcomm Incorporated, "Power control and PHR for different waveforms," 3GPP TSG RAN WG1 Meeting #88bis, R1-1705598, Spokane, USA, Apr. 3-7, 2017, 3 pages.
Extended European Search Report in European AppIn No. 23175543.0, dated Nov. 9, 2023, 9 pages.

* cited by examiner

CONTROL INFORMATION OBTAINING METHOD AND APPARATUS

CROSS-REFERENCE TO RELATED APPLICATIONS

This application is a continuation of U.S. patent application Ser. No. 16/668,939, filed on Oct. 30, 2019, which is a continuation of International Application No. PCT/CN2018/085091, filed on Apr. 28, 2018. The International Application claims priority to Chinese Patent Application No. 201710313617.2, filed on May 5, 2017. All of the aforementioned patent applications are hereby incorporated by reference in their entireties.

TECHNICAL FIELD

The present invention relates to the field of mobile communications technologies, and in particular, to a control information technology in a wireless communications system.

BACKGROUND

An orthogonal frequency division multiplexing (OFDM) technology and a discrete fourier transform-spread orthogonal frequency division multiplexing (DFT-S OFDM) technology are two typical waveforms used in wireless communication. The OFDM technology is a multi-carrier modulation technology in which a data flow is divided into a plurality of parallel subcarriers for transmission, a relatively low data rate may be used on each subcarrier, and a relatively high transmission rate is reached as a whole. The OFDM has advantages of a strong anti-multipath interference capability and a flexible frequency division multiplexing manner. However, a main disadvantage of the OFDM is an excessively high peak to average power ratio (PAPR). However, discrete fourier transform (DFT) is introduced into the DFT-S-OFDM before inverse fast fourier transform (IFFT) is performed in the OFDM. Because the DFT-S-OFDM inherits a plurality of advantages of the OFDM, the DFT-S-OFDM provides a PAPR far lower than that of the OFDM. In addition, although the DFT-S-OFDM inherits a subcarrier processing process of the OFDM, the technology is generally considered as a single-carrier technology because the technology supports only consecutive resource allocation.

In an early mobile communications system, only the DFT-S-OFDM technology is used in an uplink (namely, a channel used by a terminal to send data to a network device). When the terminal is always configured to support a DFT-S-OFDM waveform, the network device sends scheduling information to the terminal by using downlink control information (DCI). Specifically, the scheduling information may include consecutive resource allocation information, a modulation scheme, power control information, and the like. After receiving the scheduling information sent by the network device, the terminal may configure a preset DFT-S-OFDM waveform based on the scheduling information, to send uplink data. However, the inventor finds that with evolution of technologies, this configuration manner is increasingly inflexible, and consequently user experience is affected.

SUMMARY

The present invention describes a control information sending method and an apparatus, so that a network device can configure an appropriate waveform for a terminal, thereby improving user experience.

According to a first aspect, an embodiment of the present invention provides a control information sending method, where the method includes:

generating, by a network device, control information, where the control information includes information indicating an uplink transmission waveform of a terminal; and sending, by the network device, the control information to the terminal.

In a possible design, the control information is radio resource control RRC signaling, a media access control-control element MAC CE, or downlink control information DCI. The network device may send the control information to one terminal based on a specific requirement for flexible waveform configuration, for example, by using unicast RRC signaling. The network device may alternatively send the control information to a plurality of terminals, for example, by using multicast or broadcast RRC signaling.

In a possible design, the uplink transmission waveform is an orthogonal frequency division multiplexing OFDM waveform or a discrete fourier transform-spread orthogonal frequency division multiplexing DFT-S-OFDM waveform; or the uplink transmission waveform is an OFDM waveform and a DFT-S-OFDM waveform.

In a possible design, the control information is used to indicate a waveform used when the terminal transmits uplink data for one time. This manner is mainly for a terminal whose channel characteristic changes relatively fast, and therefore maximum flexibility is provided. The control information may alternatively be used to indicate a waveform used when the terminal transmits uplink data for a plurality of times. To be specific, after the network device configures one waveform for the terminal, the terminal may always transmit the uplink data by using the waveform without changing the waveform, in other words, the terminal may transmit the uplink data for a plurality of times by using the waveform. This method is mainly for a terminal whose channel changes relatively slow, and therefore communication between the network device and the terminal is simplified.

In a possible design, the method further includes the following steps:

generating, by the network device, another piece of control information, where the another piece of control information includes another piece of information indicating the uplink transmission waveform of the terminal; and sending, by the network device, the another piece of control information to the terminal.

In a possible implementation, the another piece of control information is radio resource control RRC signaling, a media access control-control element MAC CE, or downlink control information DCI.

In a possible implementation, a waveform indicated by the another piece of information indicating the uplink transmission waveform of the terminal is the orthogonal frequency division multiplexing OFDM waveform or the discrete fourier transform-spread orthogonal frequency division multiplexing DFT-S-OFDM waveform.

In a possible design, the information indicating the uplink transmission waveform of the terminal is transmission mode TM information, modulation and coding scheme MCS information, or waveform and power control mixed information. Alternatively, the control information is downlink control information DCI; and a length of the DCI indicates at least one uplink transmission waveform, or the DCI includes one piece of waveform indication information. In addition, the DCI may include a group of waveform indication information. For example, by using a group of beam pair identifiers and corresponding waveform information, the uplink transmission waveform of the terminal can be configured when the network device and the terminal communicate at a high frequency. It should be noted that the group of waveform indication information may alternatively be transmitted by using the radio resource control RRC signaling or the media access control-control element MAC CE. Alternatively, the information indicating the uplink transmission waveform is at least one piece of power control information, and a cumulative power offset of the at least one piece of power control information is used by the terminal to determine a waveform. Similarly, the another piece of information indicating the uplink transmission waveform of the terminal may also be that in any one of the foregoing five manners.

In a possible design, the control information further includes scheduling information, and the scheduling information includes at least consecutive or discrete resource mapping information and a non-compressed or compressed modulation and coding scheme. Optionally, the scheduling information further includes frequency domain spectrum shaping FDSS indication information, and the FDSS indication information is used to indicate whether the terminal uses an FDSS technology. The scheduling information and the waveform information are simultaneously sent, so that communication overheads can be reduced while uplink scheduling on the terminal is completed.

According to a second aspect, an embodiment of the present invention provides a control information receiving method, where the method includes:

receiving, by a terminal, control information sent by a network device, where the control information includes information indicating an uplink transmission waveform; and determining, by the terminal based on the control information, a waveform used to send uplink data.

In a possible design, the control information is radio resource control RRC signaling, a media access control-control element MAC CE, or downlink control information DCI.

In a possible design, the uplink transmission waveform is an orthogonal frequency division multiplexing OFDM waveform or a discrete fourier transform-spread orthogonal frequency division multiplexing DFT-S-OFDM waveform.

In a possible design, the control information is used to indicate a waveform used when the terminal transmits uplink data for one time. This manner is mainly for a terminal whose channel characteristic changes relatively fast, and therefore maximum flexibility is provided. The control information may alternatively be used to indicate a waveform used when the terminal transmits uplink data for a plurality of times. To be specific, after the network device configures one waveform for the terminal, the terminal may always transmit the uplink data by using the waveform without changing the waveform, in other words, the terminal may transmit the uplink data for a plurality of times by using the waveform. This method is mainly for a terminal whose channel changes relatively slow, and therefore communication between the network device and the terminal is simplified.

In a possible design, the information indicating the uplink transmission waveform is transmission mode TM information, modulation and coding scheme MCS information, or waveform and power control mixed information. Alternatively, the control information is downlink control information DCI; and a length of the DCI indicates at least one uplink transmission waveform, or the DCI includes one piece of waveform indication information. In addition, the DCI may include a group of waveform indication information. For example, by using a group of beam pair identifiers and corresponding waveform information, the uplink transmission waveform of the terminal can be configured when the network device and the terminal communicate at a high frequency. It should be noted that the group of waveform indication information may alternatively be transmitted by using the radio resource control RRC signaling or the media access control-control element MAC CE. Alternatively, the information indicating the uplink transmission waveform is at least one piece of power control information, and a waveform of the terminal is determined by using both a cumulative power offset of the at least one piece of power control information and a power value set by the terminal.

In a possible design, the method further includes:

determining, by the terminal based on the determined waveform used to send the uplink data, a to-be-detected downlink control information DCI format;

receiving, by the terminal, scheduling information sent by the network device; and sending, by the terminal, the uplink data based on the determined waveform used to send the uplink data and a scheduling parameter indicated by the scheduling information. It should be noted that the scheduling information is sent by using the DCI.

The terminal determines the to-be-detected DCI format by using waveform information that the terminal has known, and does not detect all DCI formats supported by the terminal, so as to simplify a related processing procedure of the terminal.

According to a third aspect, an embodiment of the present invention provides a network device, where the network device includes a processor and a transceiver, where the processor is configured to generate control information, where the control information includes information indicating an uplink transmission waveform of a terminal; and the transmitter is configured to send the control information to the terminal.

In a possible design, the control information is radio resource control RRC signaling, a media access control-control element MAC CE, or downlink control information DCI.

In a possible design, the uplink transmission waveform is an orthogonal frequency division multiplexing OFDM waveform or a discrete fourier transform-spread orthogonal frequency division multiplexing DFT-S-OFDM waveform; or the uplink transmission waveform is an OFDM waveform and a DFT-S-OFDM waveform.

In a possible design, the control information is used to indicate a waveform used when the terminal transmits uplink data for one time. This manner is mainly for a terminal whose channel characteristic changes relatively fast, and therefore maximum flexibility is provided. The control information may alternatively be used to indicate a waveform used when the terminal transmits uplink data for a plurality of times. To be specific, after the network device configures one waveform for the terminal, the terminal may always transmit the uplink data by using the waveform without changing the waveform, in other words, the terminal may transmit the uplink data for a plurality of times by using the waveform. This method is mainly for a terminal whose channel changes relatively slow, and therefore communication between the network device and the terminal is simplified.

In a possible design, the network device further includes the following characteristics:

The processor is further configured to generate another piece of control information, where the another piece of control information includes information indicating the uplink transmission waveform of the terminal; and the transmitter is further configured to send the another piece of control information to the terminal.

In a possible implementation, the another piece of control information is radio resource control RRC signaling, a media access control-control element MAC CE, or downlink control information DCI.

In a possible implementation, a waveform indicated by the information indicating the uplink transmission waveform of the terminal is the orthogonal frequency division multiplexing OFDM waveform or the discrete fourier transform-spread orthogonal frequency division multiplexing DFT-S-OFDM waveform.

In a possible design, the information indicating the uplink transmission waveform of the terminal is transmission mode TM information, modulation and coding scheme MCS information, or waveform and power control mixed information. Alternatively, the control information is downlink control information DCI; and a length of the DCI indicates at least one uplink transmission waveform, or the DCI includes one piece of waveform indication information. In addition, the DCI may include a group of waveform indication information. For example, by using a group of beam pair identifiers and corresponding waveform information, the uplink transmission waveform of the terminal can be configured when the network device and the terminal communicate at a high frequency. It should be noted that the group of waveform indication information may alternatively be transmitted by using the radio resource control RRC signaling or the media access control-control element MAC CE. Alternatively, the information indicating the uplink transmission waveform of the terminal is at least one piece of power control information, and a cumulative power offset of the at least one piece of power control information is used by the terminal to determine a waveform. Similarly, the another piece of information indicating the uplink transmission waveform of the terminal may also be that in any one of the foregoing five manners.

In a possible design, the control information further includes scheduling information, and the scheduling information includes at least consecutive or discrete resource mapping information and a non-compressed or compressed modulation and coding scheme. Optionally, the scheduling information further includes frequency domain spectrum shaping FDSS indication information, and the FDSS indication information is used to indicate whether the terminal uses an FDSS technology. The scheduling information and the waveform information are simultaneously sent, so that communication overheads can be reduced while uplink scheduling on the terminal is completed.

According to a fourth aspect, an embodiment of the present invention provides a terminal, where the terminal includes a receiver and a processor, where the receiver is configured to receive control information sent by a network device, where the control information includes information indicating an uplink transmission waveform; and the processor is configured to determine, based on the control information, a waveform used to send uplink data.

In a possible design, the control information is radio resource control RRC signaling, a media access control-control element MAC CE, or downlink control information DCI.

In a possible design, the uplink transmission waveform is an orthogonal frequency division multiplexing OFDM waveform or a discrete fourier transform-spread orthogonal frequency division multiplexing DFT-S-OFDM waveform.

In a possible design, the control information is used to indicate a waveform used when the terminal transmits uplink data for one time. This manner is mainly for a terminal whose channel characteristic changes relatively fast, and therefore maximum flexibility is provided. The control information may alternatively be used to indicate a waveform used when the terminal transmits uplink data for a plurality of times. To be specific, after the network device configures one waveform for the terminal, the terminal may always transmit the uplink data by using the waveform without changing the waveform, in other words, the terminal may transmit the uplink data for a plurality of times by using the waveform. This method is mainly for a terminal whose channel changes relatively slow, and therefore communication between the network device and the terminal is simplified.

In a possible design, the information indicating the uplink transmission waveform is transmission mode TM information, modulation and coding scheme MCS information, or waveform and power control mixed information. Alternatively, the control information is downlink control information DCI; and a length of the DCI indicates at least one uplink transmission waveform, or the DCI includes one piece of waveform indication information. In addition, the DCI may include a group of waveform indication information. For example, by using a group of beam pair identifiers and corresponding waveform information, the uplink transmission waveform of the terminal can be configured when the network device and the terminal communicate at a high frequency. It should be noted that the group of waveform indication information may alternatively be transmitted by using the radio resource control RRC signaling or the media access control-control element MAC CE. Alternatively, the information indicating the uplink transmission waveform is at least one piece of power control information, and a waveform of the terminal is determined by using both a cumulative power offset of the at least one piece of power control information and a power value set by the terminal.

In a possible design, the processor is further configured to determine, based on the determined waveform used to send the uplink data, a to-be-detected DCI format; the receiver is further configured to receive scheduling information sent by the network device; and the terminal further includes a transmitter, where the transmitter is configured to send the uplink data based on the determined waveform used to send the uplink data and a scheduling parameter indicated by the scheduling information. It should be noted that the scheduling information is sent by using the DCI.

The terminal determines the to-be-detected DCI format by using a waveform that the terminal has known, and does not detect all DCI formats supported by the terminal, so as to simplify a related processing procedure of the terminal.

According to a fifth aspect, an embodiment of the present invention provides a data processing apparatus, where the data processing apparatus is located in a terminal, and the data processing apparatus includes a processor and an interface, where the processor is configured to obtain a waveform based on control information received by a receiver of the terminal, where the downlink control information is sent by a network device, and the control information includes information indicating an uplink transmission waveform; and the processor is further configured to provide to-be-sent uplink data for a transmitter of the terminal through the interface, so that the transmitter sends the uplink data by using the waveform.

In a possible design, the control information is radio resource control RRC signaling, a media access control-control element MAC CE, or downlink control information DCI.

In a possible design, the uplink transmission waveform is an orthogonal frequency division multiplexing OFDM waveform or a discrete fourier transform-spread orthogonal frequency division multiplexing DFT-S-OFDM waveform.

In a possible design, the control information is used to indicate a waveform used when the terminal transmits uplink data for one time. This manner is mainly for a terminal whose channel characteristic changes relatively fast, and therefore maximum flexibility is provided. The control information may alternatively be used to indicate a waveform used when the terminal transmits uplink data for a plurality of times. To be specific, after the network device configures one waveform for the terminal, the terminal may always transmit the uplink data by using the waveform without changing the waveform, in other words, the terminal may transmit the uplink data for a plurality of times by using the waveform. This method is mainly for a terminal whose channel changes relatively slow, and therefore communication between the network device and the terminal is simplified.

In a possible design, the information indicating the uplink transmission waveform is transmission mode TM information, modulation and coding scheme MCS information, or waveform and power control mixed information. Alternatively, the control information is downlink control information DCI; and a length of the DCI indicates at least one uplink transmission waveform, or the DCI includes one piece of waveform indication information. In addition, the DCI may include a group of waveform indication information. For example, by using a group of beam pair identifiers and corresponding waveform information, the uplink transmission waveform of the terminal can be configured when the network device and the terminal communicate at a high frequency. It should be noted that the group of waveform indication information may alternatively be transmitted by using the radio resource control RRC signaling or the media access control-control element MAC CE. Alternatively, the information indicating the uplink transmission waveform is at least one piece of power control information, and a waveform of the terminal is determined by using both a cumulative power offset of the at least one piece of power control information and a power value set by the terminal.

According to a sixth aspect, an embodiment of the present invention provides a scheduling information receiving method, where the method includes:

receiving, by a terminal, a random access response message sent by a network device, where the random access response message is used for uplink channel scheduling, and corresponds to at least one of a plurality of uplink transmission waveforms; and sending, by the terminal, uplink data to the network device by using a scheduling parameter indicated by the random access response message.

In a possible design, the plurality of uplink transmission waveforms include at least an orthogonal frequency division multiplexing OFDM waveform and a discrete fourier transform-spread orthogonal frequency division multiplexing DFT-S-OFDM waveform.

In a possible design, the waveform corresponding to the random access response message is an orthogonal frequency division multiplexing OFDM waveform or a discrete fourier transform-spread orthogonal frequency division multiplexing DFT-S-OFDM waveform; or the waveform corresponding to the random access response message is an OFDM waveform and a DFT-S-OFDM waveform.

Compared with the prior art, in the solutions provided in the present invention, a waveform of the terminal may be flexibly configured through one or more interactions between the terminal and the network device, so that the terminal can select appropriate waveforms based on different statuses of the terminal, to transmit uplink data, thereby improving performance of communication between the terminal and the network device, and improving user experience.

BRIEF DESCRIPTION OF DRAWINGS

The following describes the embodiments of the present invention in more details with reference to accompanying drawings.

DESCRIPTION OF EMBODIMENTS

A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that with evolution of network architectures and emergence of new service scenarios, the technical solutions provided in the embodiments of the present invention are also applicable to similar technical problems.

Figure 1:
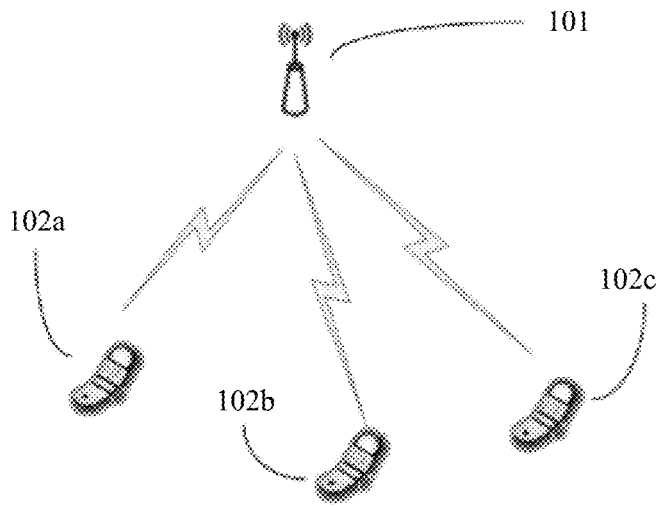
FIG. 1 is a diagram of a possible application scenario according to the present invention.

The technical solutions in the embodiments of the present invention may be applied to a wireless communications system such as a future 5G communications system that supports at least two waveforms. FIG. 1 is a schematic diagram of a possible network to which the present invention is applicable. Terminals 102a, 102b, and 102c are connected to a network device 101. The network device may support a plurality of access technologies, and provide a plurality of services for the terminal by using the plurality of access technologies.

Specifically, the terminal may communicate with one or more network devices by using a radio access network (RAN). The terminal may be user equipment (UE), an access terminal, a subscriber unit, a subscriber station, a mobile console, a remote station, a remote terminal, a mobile device, a user terminal, a wireless communications device, a user agent, or a user apparatus. For example, the terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal in a future 5G network. The network device in the present invention is an apparatus that is disposed in the RAN and that is configured to provide a wireless communication function for the terminal. For example, the network device may be a base transceiver station (BTS) in a GSM system or a CDMA system, or may be a NodeB (NB) in a WCDMA system, or may be an evolved NodeB (eNB or eNodeB) in an LTE system; or the network device may be a relay station, an access point, an in-vehicle device, a wearable device, a network-side device (which is sometimes referred to as a next-generation NodeB (gNB)) in a future 5G network, or a network device in a future evolved public land mobile system (PLMN) network.

Currently, the 3rd Generation Partnership Project (3GPP) is formulating a new-generation wireless communications standard, namely, new radio (NR), which specifies that two technologies: OFDM and DFT-S-OFDM are supported in an uplink. An OFDM waveform can provide a larger capacity in a high signal-to-noise ratio scenario, and therefore is applicable to a cell center user. A DFT-S-OFDM waveform featured by a low PAPR provides a higher output power of a power amplifier, and therefore provides a wider coverage area, and is more applicable to a cell edge user with limited coverage. It can be learned that the terminal may obtain better performance by using different waveforms, to obtain better user experience. For example, when the terminal is at a cell center, the terminal may obtain relatively good performance (for example, a throughput or a block error rate) at relatively low power by using the OFDM waveform. When the terminal is on a cell edge, the terminal needs to use the DFT-S-OFDM waveform featured by a single carrier to normally perform data communication with the network device, so as to improve transmit power and ensure communication performance.

In the NR standard, the terminal needs to support both the OFDM technology and the DFT-S-OFDM technology. Waveform configuration is determined by the network device (for example, the gNB) based on specific information of the terminal (for example, a factor such as a location of the terminal or channel quality information fed back by the terminal). Therefore, a waveform information sending method is needed to support the network device in transmitting waveform information selected by the network device to the terminal, so that the terminal can determine, based on the waveform information, a waveform used to send uplink data. In the solutions provided in this application, the network device may flexibly configure a waveform of the terminal, so that the terminal transmits uplink channel data by using an appropriate waveform, thereby providing better user experience.

The network device semi-statically or dynamically configures a waveform for the terminal. The semi-static waveform configuration means that after receiving waveform configuration information, the terminal always transmits uplink data by using the waveform until the terminal receives waveform configuration information sent by the network device again. The dynamic waveform configuration means that before transmitting uplink data, the terminal needs to determine, based on waveform configuration information sent by the network device, a waveform type currently used to transmit the uplink data.

The following further describes the embodiments of the present invention in detail based on the foregoing similarities in the present invention. It should be noted that for ease of description, the following embodiments are all described by using an example in which the terminal supports two waveforms (namely, an OFDM waveform and a DFT-S-OFDM waveform). However, the embodiments of the present invention may be further applied to a system that supports more than two waveforms.

Embodiment 1

An embodiment of the present invention provides a waveform control information processing method and a network device and a terminal based on the method. The network device and the terminal complete waveform configuration through at least one interaction. The following describes this embodiment of the present invention in detail with reference to FIG. 2.

201. The network device generates control information, where the control information includes information indicating an uplink transmission waveform.

Specifically, the network device may transmit waveform information by using radio resource control (RRC) signaling or media access control (MAC) layer signaling (which is sometimes referred to as a MAC-control element (CE)) as the control information.

In a possible implementation, the network device explicitly transmits the information indicating the uplink transmission waveform. For example, different configurations may be used in an existing RRC message or a newly defined RRC message to represent different types of waveform information. For example, one configuration is used to represent an OFDM waveform, another configuration is used to represent a DFT-S-OFDM waveform, and still another configuration is used to represent the OFDM waveform or the DFT-S-OFDM waveform. It should be noted that no explicit waveform information is provided in the last configuration. Therefore, after receiving the information, the terminal cannot determine a waveform used to transmit uplink data, and needs to wait for another piece of waveform indication information of the network device.

In another possible implementation, the network device explicitly sends a plurality of pieces of waveform indication information and a scenario used for the waveform configuration. For example, when the network device and the terminal communicate at a high frequency, a plurality of wireless communication links (which are also referred to as beam pairs) may be formed between the network device and the terminal. Therefore, the network device and the terminal may select different communication links for communication. In a specific example, one terminal has five uplink beam pairs, namely, five uplink communication links, and numbers of these links are 1, 2, 3, 4, and 5. When sending the waveform information, the network device may send a group of waveform configuration information, to indicate a specific waveform and a number of an uplink beam pair using the waveform. For example, the network device may send (1, OFDM), (2, DFT-S-OFDM), (3, OFDM), (4, either OFDM or DFT-S-OFDM), and (5, OFDM). It should be noted that the beam pair refers to a unidirectional link, to be specific, a downlink beam pair includes one transmit beam of the network device and one receive beam of the terminal, and is used by the network device to send data to the terminal; and an uplink beam pair includes one transmit beam of the terminal and one receive beam of the network device, and is used by the terminal to send data to the network device. A specific representation manner of a correspondence between an uplink beam pair and used waveform information is not limited in the present invention.

In another possible implementation, the network device may alternatively implicitly transmit the waveform information. For example, the network device configures a transmission mode (TM) of the terminal by using an RRC layer signaling message, to indirectly transmit the waveform information. For example, the TM sent by the network device includes a multi-stream transmission indication, to indicate that the OFDM waveform needs to be configured for the terminal. To be specific, when receiving the TM information sent by the network device, the terminal may determine that a waveform configured by the network device for the terminal is the OFDM waveform. For another example, if the TM received by the terminal supports pi/2 binary phase shift keying (BPSK) modulation scheme, the terminal may determine that a waveform configured by the network device for the terminal is the DFT-S-OFDM waveform. For still another example, if the TM received by the terminal supports single-stream transmission and consecutive resource mapping, it may be understood that a waveform configured by the network device for the terminal is the two waveforms.

For brevity, the network device may explicitly or implicitly transmit the information indicating the uplink transmission waveform. For more specific implementation methods, refer to descriptions in Embodiment 2. Details are not described herein.

It should be noted that the RRC signaling may be sent to one or more terminals in a broadcast, multicast, or unicast manner. For example, master information block (MIB) information is broadcast information, and the information is sent through a physical broadcast channel (PBCH). For another example, system information block (SIB) information is also a broadcast message, and the message is sent through a physical downlink shared channel (PDSCH). Similar to the SIB information, both multicast information and unicast information are sent through the PDSCH. A difference between multicast and unicast lies in that quantities of users who receive a corresponding message are different, and there are a plurality of users who receive a corresponding message in the multicast and there is one user who receives a corresponding message in the unicast. It can be learned that the network device may control waveform configurations of the one or more terminals by using the control message. For example, if the network device wants to configure one waveform for all devices in an entire cell covered by the network device, the control information may be an RRC broadcast message. The network device 101 shown in FIG. 1 may send the control message to the three terminals in the network, namely, terminals 102a, 102b, and 102c. For another example, if the network device wants to configure a same waveform for a plurality of devices in an entire cell covered by the network device, the control information may be an RRC multicast message. For example, the network device 101 sends the multicast message to the terminals 102a and 102b.

It should be further noted that the control information sent in this step can indicate a subset including all waveforms that can be supported by the terminal. In a possible implementation, the control information sent in this step may indicate one waveform. For example, a waveform that may be selected by the network device is the OFDM waveform or the DFT-S-OFDM waveform. In another possible implementation, the control information sent in this step may indicate one waveform and a plurality of waveforms. For example, a waveform that may be selected by the network device is the OFDM waveform or the OFDM waveform and the DFT-S-OFDM waveform, or the DFT-S-OFDM waveform or the OFDM waveform and the DFT-S-OFDM waveform.

202. The network device sends the control information.

Specifically, the network device may determine, based on a message type carrying the control message, whether to send the control message through the PDSCH or the PBCH. It should be noted that, after receiving the control information, the terminal needs to obtain the waveform information included in the control information through parsing based on the control information. In a possible implementation, the included waveform information may be a plurality of pieces of waveform information, for example, the OFDM waveform and the DFT-S-OFDM waveform. In this case, the terminal cannot determine the waveform used to transmit the uplink data, and further needs to wait for another piece of control information of the network device. In another possible implementation, the included waveform information may indicate one waveform, for example, the OFDM waveform.

203. The network device generates another piece of control information, where the another piece of control information includes information indicating the uplink transmission waveform.

Specifically, the network device may use a MAC CE or downlink control information (DCI) as the another piece of control information. The DCI information is sent through a physical downlink control channel (PDCCH).

It should be noted that the another piece of control information explicitly indicates one waveform. For example, when the control message in step 201 indicates two waveforms (namely, the OFDM waveform and the DFT-S-OFDM waveform), the another piece of control information explicitly indicates the OFDM waveform. It should be further noted that this step is optional. For example, if one waveform has been explicitly indicated in parts 401 and 402, this step is not needed. It should be additionally noted that this embodiment is described for one waveform configuration. In an application scenario of a plurality of waveforms, even when one waveform is explicitly indicated by using the control information in steps 401 and 402, the network device may also send the another piece of control information to change the waveform configuration. For specific descriptions, refer to Embodiment 3. Details are not described herein.

204. The network device sends the another piece of control information.

Specifically, the network device may determine, based on a message (or signaling) type used as the another piece of control information, whether to send the another piece of control information through the PDSCH or the PDCCH.

205. The terminal determines a waveform used to send uplink data.

Specifically, the terminal receives the control information sent by the network device, and determines, based on the control information, the waveform used to send the uplink data.

In a possible implementation, the network device performs steps 201 and 202, and the terminal determines specific waveform information based on the control information. For example, the waveform is the OFDM waveform. For another example, the waveform is the DFT-S-OFDM waveform. In another possible implementation, the network device performs steps 201 to 204, and the terminal determines one piece of waveform information based on the another piece of control information, and indicates waveform configuration on an uplink channel (for example, a physical uplink shared channel (PUSCH)) by using the waveform information.

It should be noted that, regardless of whether there is one or two control messages, the control information is semi-statically sent by using the RRC signaling or the MAC CE. To be specific, after receiving explicit (or one piece of) waveform indication information, the terminal subsequently transmits the uplink data for a plurality of times by using the waveform, and only when receiving waveform switching indication information (or when receiving the waveform configuration information again), the terminal changes the waveform used to transmit the uplink data. An advantage is that for a terminal whose channel characteristic changes relatively slow, configuration overheads can be reduced in such the semi-static configuration manner.

As described in Embodiment 2 for the DCI, according to this method, dynamic waveform configuration may be implemented, to be specific, during each transmission, the terminal controls current waveform configuration on an uplink channel by using the DCI that includes the waveform indication information and that is sent by the network device. Therefore, a manner of indicating a waveform by using a combination of the RRC and the DCI indicates two waveforms, a manner of indicating a waveform by using a combination of the MAC CE and the DCI indicates one waveform, and the waveform configuration is modified based on a requirement. This manner is mainly for a terminal whose channel characteristic changes relatively fast, and therefore better flexibility than that in the semi-static manner can be provided.

In this embodiment, the network device flexibly controls a waveform of the terminal. For example, when the terminal is at a center of a cell, the network device configures the OFDM waveform for the terminal, so that the terminal can obtain relatively good channel performance of communication with the network device at relatively low power. For another example, when the terminal is on an edge of a cell, the network device configures the DFT-S-OFDM waveform for the terminal, so that the terminal can normally perform data communication with the network device. In this way, the terminal can transmit uplink data by using an appropriate waveform, so as to improve user experience.

Embodiment 2

An embodiment of the present invention provides another waveform control information processing method and a network device and a terminal based on the method. The network device and the terminal complete waveform configuration through only one interaction. The following describes this embodiment of the present invention in detail with reference to FIG. 3.

301. The network device generates control information, where the control information includes information indicating an uplink transmission waveform.

Figure 2:
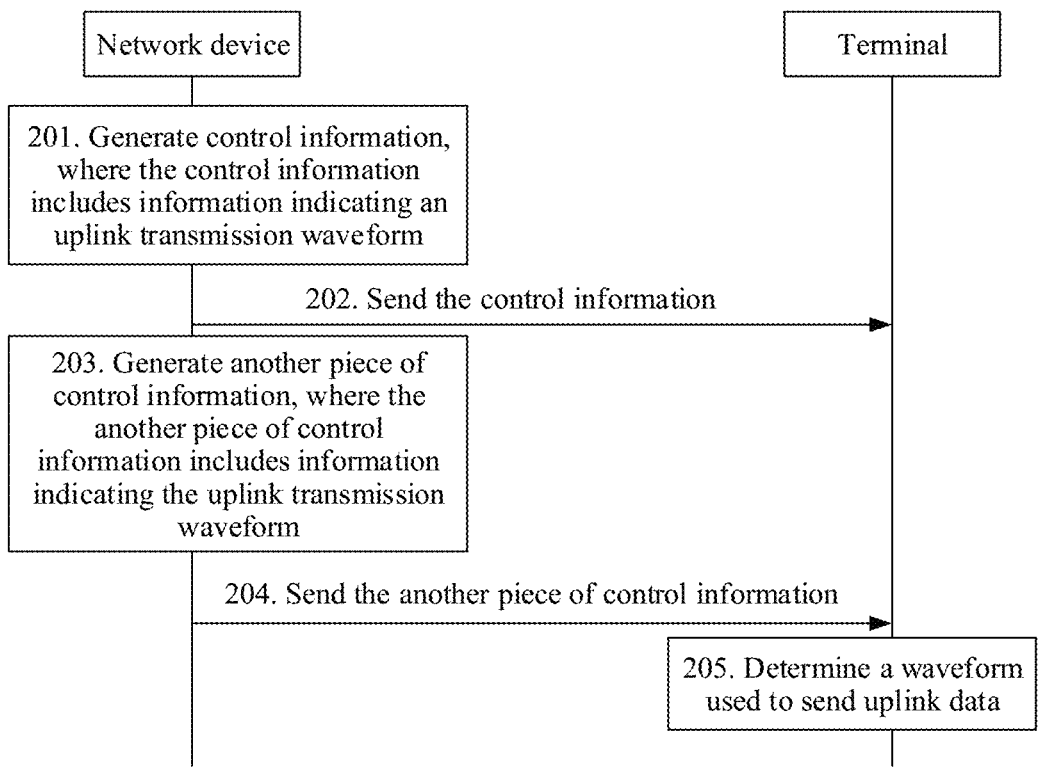
FIG. 2 is a schematic communication diagram of one type of waveform control information processing according to an embodiment of the present invention.

This step is similar to step 201 in FIG. 2, and details are not described herein again. Differences are as follows: First, a control message provided by using either RRC or a MAC CE includes an explicit waveform indication, in other words, a waveform indication needs to be provided. Second, the control message in step 301 may alternatively be DCI.

In a possible implementation, a length of the DCI, for example, DCI 4 shown in Table 2, indicates a specific waveform. If the terminal receives the DCI 4, the terminal only needs to determine whether a length value of the DCI 4 matches (in other words, is the same as) a length of a DCI format supported by the terminal, to determine that a waveform corresponding to the DCI is a DFT-S-OFDM waveform. For brevity, the terminal may directly determine, through length value matching, a waveform that needs to be used for current transmission.

The DCI may include scheduling DCI and non-scheduling DCI. The scheduling DCI is DCI that includes at least a (consecutive or discrete) resource mapping manner and a (non-compressed or compressed) modulation and coding scheme. Optionally, the scheduling DCI may further include another parameter. For specific descriptions of the scheduling parameter, refer to Table 1. Details are not described herein. The non-scheduling DCI is DCI that does not include configuration information such as a resource mapping manner and a modulation and coding scheme, for example, DCI that includes only power control.

In another possible implementation, after the terminal receives one piece of DCI, if a matched known DCI may indicate at least two waveforms, the terminal further needs to parse a field included in the DCI, to determine waveform information indicated by the DCI. Specifically, waveform configuration information may be obtained by using a simple waveform indication field (for example, a waveform indication field of DCI 1) or a mixed indication field (for example, a waveform and power control mixed indication field of DCI 6). The DCI 6 in Table 2 is used as an example, and one field may be used to represent combination information of a power control command and a waveform indication. In an example, the power control command includes three commands, namely, {+1 dB, 0 dB, +1 dB}, and the waveform indication indicates two optional waveforms: {OFDM, DFT-S-OFDM}. If only four combination control commands {+1 dB (OFDM), 0 dB (OFDM), −1 dB (OFDM), and 0 dB (DFT-S-OFDM)} are needed, a combination of the two parameters may be indicated by a 2-bit field, to be specific, may be indicated by 00, 01, 10, and 11. It should be noted that the waveform and the power control mixed information may be sent by using the scheduling DCI, or may be sent by using the non-scheduling DCI. This is not limited in the present invention.

It should be additionally noted that to reduce overheads, the network device may further indirectly transmit the waveform indication information by using another field. For example, modulation and coding scheme MCS (for meanings, refer to Table 1) information included in the scheduling DCI is classified, some of MCS values are used to indicate an OFDM waveform, and the others are used to indicate a DFT-S-OFDM waveform. In a possible implementation, it is assumed that a value supported by the MCS ranges from 0 to 28. When the MCS is set to 0 to 9, a waveform corresponding to the MCS may be configured as the DFT-S-OFDM waveform. When the MCS is set to 10 to 28, a corresponding waveform is configured as the OFDM waveform. For another example, the terminal may indirectly determine, by using one or more pieces of power control indication information sent by the network device, a waveform that needs to be used. Specifically, after the terminal receives one or more power control indications (which may also be referred to as power offset indications), if power that is obtained after a power offset (or a cumulative power offset) indicated by the power control indication information is applied to transmit power of a waveform (for example, the OFDM waveform) exceeds maximum transmit power that the terminal can reach, the terminal may determine that a waveform that needs to be used by the terminal is the DFT-S-OFDM waveform. On the contrary, if power that is obtained after an offset (or a cumulative power offset) is applied to transmit power calculated through OFDM does not exceed maximum transmit power that the terminal can reach, the OFDM waveform is used.

302. The network device sends the control information.

Specifically, the network device selects one of a PBCH, a PDSCH, and a PDCCH based on a specific message type used as the control message, to send the control message.

303. The terminal determines a waveform used to send uplink data.

This step is similar to step 205 described in Embodiment 1, and details are not described herein again. Differences are as follows: First, the control information received by the terminal indicates one piece of waveform information. Second, a semi-static manner may be implemented in three different manners (a MAC CE, RRC, or DCI), but dynamic waveform scheduling may be implemented only in the DCI manner.

In this embodiment, the network device flexibly controls a waveform of the terminal. For example, when the terminal is at a center of a cell, the network device configures the OFDM waveform for the terminal, so that the terminal can obtain relatively good channel performance of communication with the network device at relatively low power. For another example, when the terminal is on an edge of a cell, the network device configures the DFT-S-OFDM waveform for the terminal, so that the terminal can normally perform data communication with the network device. In this way, the terminal can transmit uplink data by using an appropriate waveform, so as to improve user experience.

Embodiment 3

Figure 4:
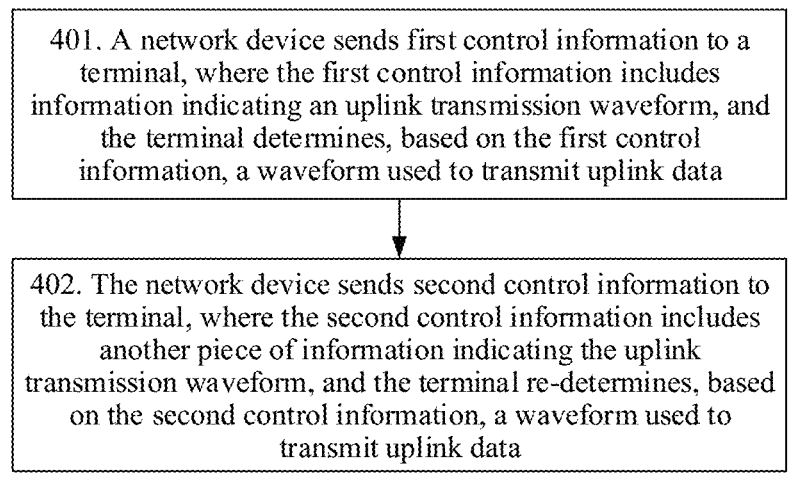
FIG. 4 is a schematic flowchart of still another type of waveform control information processing according to an embodiment of the present invention.

An embodiment of the present invention provides still another waveform control information processing method and a network device and a terminal based on the method. The network device sends waveform control information for a plurality of times to refresh or replace previous waveform configuration, so as to change the waveform configuration of the terminal. It should be noted that only some key steps are provided in this embodiment. For detailed waveform configuration steps, refer to Embodiment 1, Embodiment 2, Embodiment 4, and Embodiment 5. Details are not described herein. The following describes this embodiment of the present invention in detail with reference to FIG. 4.

401. The network device sends first control information to the terminal, where the first control information includes information indicating an uplink transmission waveform, and the terminal determines, based on the first control information, a waveform used to transmit uplink data.

This step is similar to steps 301 to 303 in Embodiment 2, and details are not described herein again. It should be noted that this step is a key step of one waveform configuration.

402. The network device sends second control information to the terminal, where the second control information includes another piece of information indicating the uplink transmission waveform, and the terminal re-determines, based on the second control information, a waveform used to transmit uplink data.

This step is similar to steps 301 to 303 in Embodiment 2, and details are not described herein again. It should be noted that in a possible implementation, the first control message is sent by using RRC signaling, and the second control information is sent by using a combination of the RRC signaling and a MAC CE or a combination of the RRC signaling and DCI. Therefore, waveform configuration is reconfigured for the terminal, in other words, the terminal replaces the waveform indicated by the first control message with the waveform indicated by the second control message. In another possible implementation, a message used to carry both the first control information and the second control information is RRC signaling, in other words, waveform configuration information is refreshed or modified by using a same message. Signaling used for the first control information and the second control information is not limited in this embodiment.

In this embodiment, the network device flexibly controls a waveform of the terminal, so that the terminal can transmit uplink data by using an appropriate waveform, thereby improving user experience.

Embodiment 4

An embodiment of the present invention provides a control information processing method and a network device and a terminal based on the method. Different from Embodiment 1 to Embodiment 3, the present invention focuses on an application scenario related to DCI, to describe how the network device performs waveform configuration on the terminal and configuration of a scheduling parameter related to a waveform. Specifically, in this embodiment, the network device first transmits uplink transmission waveform information determined by the network device, and then sends scheduling information, to configure an uplink scheduling parameter (or scheduling information) of the terminal.

First, some general concepts or definitions used in this embodiment are explained.

Table 1 summarizes examples of some scheduling parameters that may be used on an uplink channel, and provides detailed explanations.

TABLE 1

Some possible uplink channel scheduling parameters and meanings thereof

| Sequence number | Field name | Meaning |
|---|---|---|
| 1 | Resource mapping | The resource mapping indicates spectrum resource information allocated by the network device to the terminal. The information may indicate one piece of consecutive spectrum resource information, or may indicate one piece of discrete spectrum resource information, which depends on a specific resource allocation manner.<br>In a possible example, a start spectrum point and a spectrum width may be used to represent the consecutive spectrum resource information. In another possible example, a spectrum resource may be divided into blocks, and one bit is used to represent a status of a resource block, to be specific, 1 indicates that the resource block is allocated to a current uplink channel, and 0 indicates that the resource is not allocated to the current uplink channel. For example, if there are currently 10 spectrum resource blocks, and resource mapping information received by the terminal is {0001010001}, it indicates that the terminal may use the fourth resource block, the sixth resource block, and the tenth spectrum resource block to transmit uplink channel data. |
| 2 | Modulation and coding scheme | The modulation and coding scheme indicates a modulation scheme and code block size information that are allocated by the network device to the terminal. Specifically, the modulation scheme may be quadrature phase shift keying (QPSK), 16 quadrature amplitude modulation (16 QAM), or the like. The code block size information may be an index of a code block size, or may indicate the code block size in another manner.<br>In a possible implementation, the modulation and coding scheme (MCS) is transmitted. Quantities of bits specifically used for modulation and coding scheme information may be different, which depends on a quantity of combinations of the modulation scheme and the code block size. For example, if there are 29 MCSs, five bits are needed. If there are only eight MCSs, only three bits are needed. For ease of description, in the present invention, a modulation and coding scheme in which only a relatively small quantity of bits (for example, three bits) need to be used is referred to as a compressed modulation and coding scheme. On the contrary, a modulation and coding scheme in which a relatively large quantity of bits (for example, eight bits) are needed is referred to as a non-compressed modulation and coding scheme or a modulation and coding scheme. |
| 3 | Power control instruction | The power control instruction instructs the terminal to adjust transmit power. Specifically, the transmit power may be a value in a unit of dB. |
| 4 | Frequency hopping indication | The frequency hopping indication indicates whether the terminal uses a frequency hopping technology between slots, which may be specifically indicated by an indication bit. For example, if the indication bit is set to 1, it indicates that the frequency hopping is used. If the indication bit is set to 0, it indicates that frequency hopping is not used. |
| 5 | Waveform indication | The waveform indication indicates waveform information that needs to be used when the terminal transmits uplink data. Specifically, if there are two waveforms for selection, a waveform may be indicated by a waveform indication bit. For example, if the indication bit is set to 1, it indicates that one waveform thereof is selected. If the indication bit is set to 0, it indicates that the other waveform is used. |
| 6 | Multi-stream transmission indication | The multi-stream transmission indication indicates whether the terminal performs multi-flow transmission, and the parameter is used only in a multi-carrier technology such as OFDM, which may be specifically indicated by a specific quantity of streams. For example, three bits may be used to indicate that eight-stream transmission is supported at most. If a value is 010, it indicates that three-flow transmission is performed. |

TABLE 1-continued

Some possible uplink channel scheduling parameters and meanings thereof

| Sequence number | Field name | Meaning |
|---|---|---|
| 7 | FDSS indication | The FDSS indication indicates whether the terminal uses a frequency domain spectrum shaping (Frequency Domain Spectrum Shaping, FDSS) technology, which may be specifically indicated by an indication bit. For example, if the indication bit is set to 1, it indicates that the FDSS technology is used. If the indication bit is set to 0, it indicates that the FDSS technology is not used. It should be noted that the FDSS technology is a technology specific to a single carrier, and is used to further reduce a PAPR of the single carrier (for example, DFT-S-OFDM). |

It should be noted that scheduling information corresponding to an uplink channel needs to include a (consecutive or discrete) resource mapping manner and a (non-compressed or compressed) modulation and coding scheme. Another parameter provided in Table 1 may be carried based on a specific application requirement. A specific quantity of optional parameters included in the scheduling information is not limited in the present invention. The following merely provides some examples of the scheduling information to clearly describe this embodiment of the present invention.

In a possible implementation, the network device may send downlink control information (DCI) through a PDCCH, to transmit a scheduling parameter. In another possible implementation, the network device may send the scheduling information through a PDSCH. For example, in a random access phase, the network device may send a random access response message through the PDSCH, to transmit the scheduling parameter.

The network device needs to select an uplink channel parameter for the terminal based on a waveform selected by the network device. However, a specific quantity of included parameters needs to be determined based on actual application. Regardless of a downlink channel through which the scheduling parameter is sent and a specific quantity of included scheduling parameters, the terminal needs to determine a waveform that should be used on an uplink channel of the terminal. For example, the terminal directly or indirectly determines the waveform configuration information by using the scheduling parameter received by the terminal, or obtains the waveform configuration information in another manner.

That the PDCCH is used as a downlink channel is used as an example. Table 2 provides some DCI formats, to be specific, provides a parameter that may be included in a specific DCI format, and waveforms that may be indicated by the DCI formats.

TABLE 2

Examples of some possible DCI formats

| DCI format name | Included field and whether the field is optional (O) or compulsory (C) | Waveform that can be indicated or applicable waveform |
|---|---|---|
| DCI 1 | Consecutive resource mapping (C), modulation and coding scheme (C), power control instruction (O), frequency hopping indication (O), waveform indication (O), and format distinguishing indication (O) | DFT-S-OFDM waveform OFDM waveform |
| DCI 2 | Discrete resource mapping (C), modulation and coding scheme (C), power control instruction (O), and format distinguishing indication (O) | OFDM waveform |
| DCI 3 | Discrete resource mapping (C), modulation and coding scheme (C), power control instruction (O), multi-stream transmission indication (C), and format distinguishing indication (O) | OFDM waveform |
| DCI 4 | Consecutive resource mapping (C), modulation and coding scheme (C), power control instruction (O), and FDSS indication (O) | DFT-S-ODFM waveform |
| DCI 5 | Consecutive resource mapping (C), compressed modulation and coding scheme (C), power control instruction (O), and FDSS indication (O) | DFT-S-ODFM waveform |
| DCI 6 | Waveform and power control mixed indication (C) | DFT-S-OFDM waveform OFDM waveform |

It should be noted that the format distinguishing indication in Table 2 is used to distinguish between different types of DCI. For example, when quantities of bits included in two different types of DCI are equal (in other words, length values of the two different types of DCI are equal), the indication information may be added for distinguishing, so as to simply distinguish between different DCI formats by using a length. Optionally, the distinguishing indication information may also be used for DCI formats with different lengths. How the field is specifically used is not limited in the present invention. In addition, it should be further noted that the DCI 6 is non-scheduling DCI (to be specific, a DCI format that includes no scheduling information). Therefore, the DCI is merely used for waveform indication instead of scheduling parameter transmission.

In addition, it should be further noted that fields included in a DCI format in Table 2 are determined. For example, the DCI 1 includes the consecutive resource mapping, the modulation and coding scheme, the power control instruction, and the frequency hopping indication. Whether a field is optional or compulsory in Table 2 refers to whether a DCI format includes a corresponding field in a specific application example. For example, in a specific implementation, the DCI format includes the consecutive resource mapping and the modulation and coding scheme, and the DCI format is still applicable to the DFT-S-OFDM waveform and the OFDM waveform. For another example, in another implementation, the DCI format may include the consecutive resource mapping, the modulation and coding scheme, and the frequency hopping indication, and similarly, the DCI format is still applicable to the DFT-S-OFDM waveform and the OFDM waveform.

In addition, it should be additionally noted that in some specific application scenarios, a DCI format that may be used for a plurality of waveforms may also be defined as a format dedicated to a specific waveform. A specific waveform that may be indicated by a DCI format is not limited in the present invention. For example, the DCI 1 in Table 2 is applicable to the DFT-S-OFDM waveform and the OFDM waveform in essence. However, it may be defined, based on an actual requirement (for example, backward compatibility), that the DCI 1 is used to indicate only the DFT-S-OFDM waveform.

Figure 5:
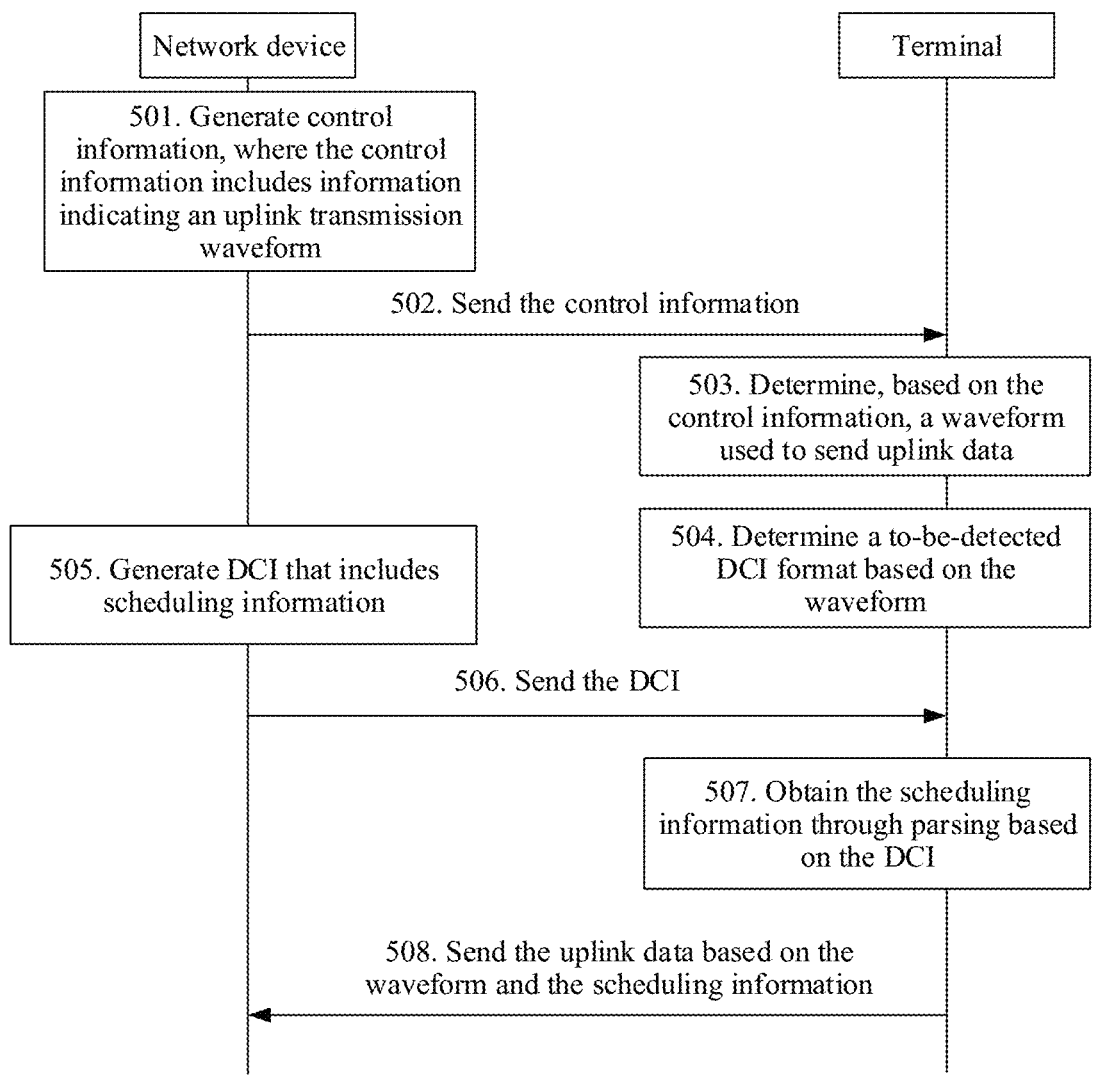
FIG. 5 is a schematic communication diagram of one type of control information processing according to an embodiment of the present invention.

It is assumed that the terminal supports the DCI 1 to the DCI 6 shown in Table 2. The following describes this embodiment of the present invention in detail with reference to FIG. 5.

501. The network device generates control information, where the control information includes information indicating an uplink transmission waveform.

502. The network device sends the control information to the terminal.

503. The terminal determines, based on the control information, a waveform used to send uplink data.

Figure 3:
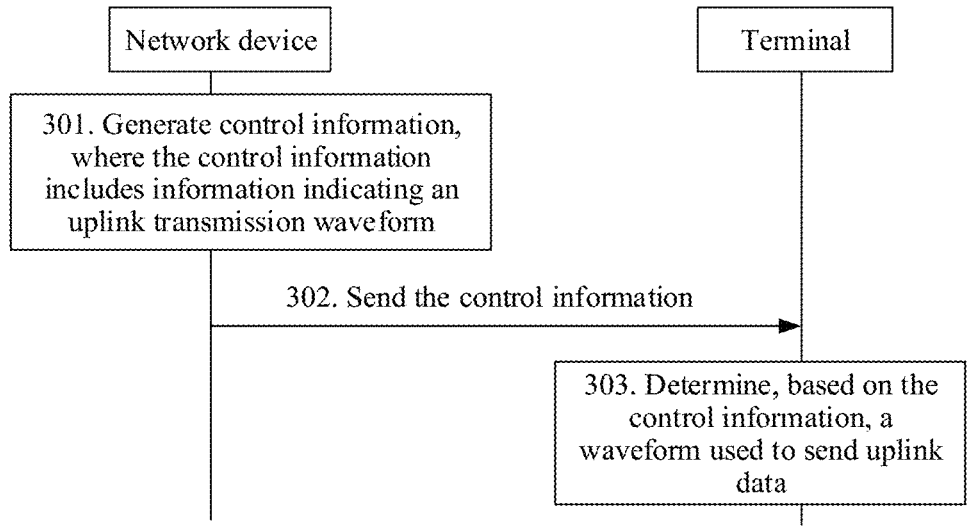
FIG. 3 is a schematic communication diagram of another type of waveform control information processing according to an embodiment of the present invention.

The three steps are similar to steps 301 to 303 shown in FIG. 3. For specific descriptions, refer to related descriptions. Details are not described herein again. It should be noted that the three steps may be further replaced with steps 201 to 205 shown in FIG. 2.

504. The terminal determines a to-be-detected DCI format based on the waveform.

Specifically, for example, the terminal has determined, in step 503, that waveform information that needs to be used by the terminal is an OFDM waveform. Therefore, the terminal does not need to match a DCI format obtained through blind detection and all DCI formats (namely, the DCI 1 to the DCI 6 in this embodiment) supported by the terminal, but only needs to match the DCI format obtained through blind detection and the DCI 1 to the DCI 3 and the DCI 6. In other words, the terminal only needs to detect some DCI formats (in other words, a subset of a DCI format set supported by the terminal) supported by the terminal, and these pieces of DCI match waveform configuration that the terminal has known. An advantage is that the terminal more easily obtains waveform information.

505. The network device generates DCI that includes scheduling information.

Specifically, the network device selects an appropriate DCI format based on the determined waveform information, to generate the DCI that includes the scheduling information. In a specific example, the network device determines that the waveform is a DFT-S-OFDM waveform, and determines that to-be-sent scheduling parameters are (consecutive) resource mapping information, a modulation and coding scheme, and an FDSS indication. Therefore, a format selected by the network device from a preconfigured DCI format list (for example, Table 2) is the DCI 4. The network device generates, based on the format DCI 4, DCI corresponding to the terminal. It should be noted that the DCI 4 includes no explicit waveform indication information. However, in a specific scenario, the DCI may include the waveform indication information, and may be used for waveform switching. For details, refer to descriptions in Embodiment 5. Details are not described herein. The DCI that includes the waveform information may alternatively be merely used to transmit an appropriate scheduling parameter set, to be specific, the included waveform indication information is consistent with known waveform information, and therefore the terminal does not need to modify the waveform configuration.

506. The network device sends the DCI.

Specifically, the network device sends the DCI to the terminal through a PDCCH.

507. The terminal obtains the scheduling information through parsing based on the DCI.

Specifically, the terminal matches, one by one, the DCI received by the terminal and the to-be-detected DCI formats determined by the terminal in step 504. After finding a format that can be used to correctly parse the received DCI, the terminal obtains the scheduling information from the received DCI through parsing.

508. The terminal sends the uplink data based on the waveform and the scheduling information.

Specifically, in steps 507 and 508, after obtaining scheduling parameters included in the DCI (for example, (consecutive) resource mapping information, a modulation and coding scheme, and a frequency hopping indication, or a plurality of parameters shown in Table 1), the terminal may configure an uplink channel (for example, an NR PUSCH) based on these parameters, to send the data to the network device.

In this embodiment, the network device flexibly controls a waveform of the terminal, so that the terminal can transmit uplink data by using an appropriate waveform, thereby improving user experience. In addition, because the terminal has known the waveform, the terminal only needs to detect some DCI formats, so as to simplify related processing and operations of the terminal.

Embodiment 5

Figure 6:
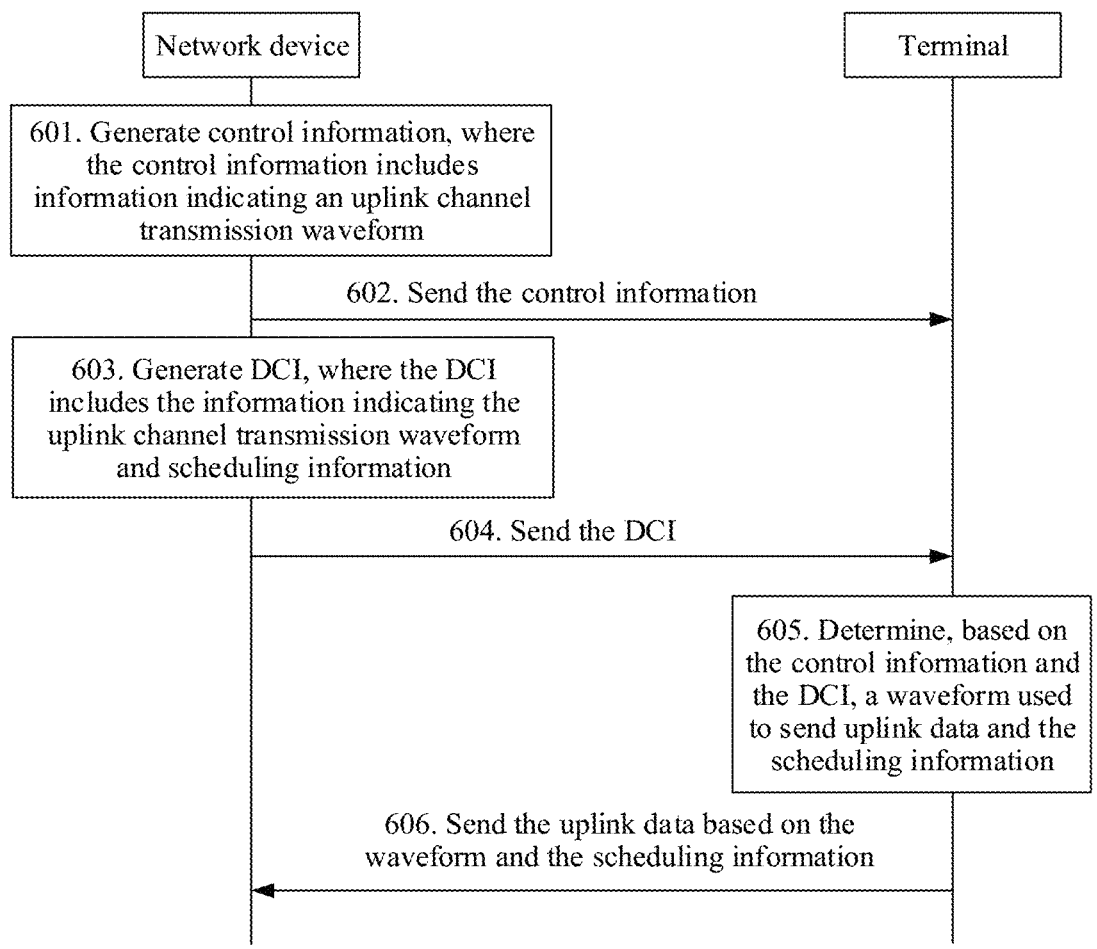
FIG. 6 is a schematic communication diagram of another type of control information processing according to an embodiment of the present invention.

An embodiment of the present invention provides another control information processing method and a network device and a terminal based on the method. Different from Embodiment 4 in which scheduling information and waveform information are sent by using different messages, in this embodiment, the scheduling information and the waveform information are carried in same DCI. For a DCI format, the examples provided in Table 2 are used in this embodiment. The following describes this embodiment of the present invention in detail with reference to FIG. 6.

601. The network device generates control information, where the control information includes information indicating an uplink transmission waveform.

602. The network device sends the control information.

The two steps are similar to steps 301 and 302 in Embodiment 2, and details are not described herein again. Differences are as follows: First, the two steps are optional. If the network device does not perform the two steps, the information indicating the uplink transmission waveform may be transmitted by using DCI in step 603. Second, if the network device performs the two steps, the control message is RRC signaling or MAC CE signaling. For example, the network device may implicitly indicate waveform information when transmitting TM information by using the RRC signaling. In an example, the TM indicates single-stream transmission and consecutive resource mapping, in other words, the terminal receives the TM information, and determines that the waveform information indicated by the network device is two waveforms: an OFDM waveform and a DFT-S-OFDM waveform. It should be noted that, after receiving the control information, the terminal needs to obtain, through parsing based on the control information, waveform information indicated by the terminal. In this embodiment, the control information received by the terminal indicates two waveforms. The terminal further needs to obtain another piece of waveform indication information sent by the network device, to determine a waveform used to transmit uplink data.

603. The network device generates DCI, where the DCI includes the information indicating the uplink transmission waveform and scheduling information.

Specifically, the network device selects an appropriate DCI format based on the scheduling information that needs to be sent. In this step, the DCI needs to explicitly indicate one piece of waveform information, and further needs to transmit the scheduling information (which is also referred to as a scheduling parameter). In an example, if the network device needs to transmit discrete resource mapping information, multi-stream transmission indication information, and the like, the network device may select the format DCI 3 shown in Table 2, to generate the DCI. It should be noted that the waveform information is implicitly transmitted by using the DCI 3, in other words, the waveform is indicated by a length of the DCI.

604. The network device sends the DCI.

Specifically, the network device sends the DCI to the terminal through a PDCCH.

605. The terminal determines, based on the control information and the DCI, a waveform used to send uplink data and the scheduling information.

606. The terminal sends the uplink data based on the waveform and the scheduling information.

Specifically, in the two steps, the terminal obtains the waveform information indicated by the DCI and the included scheduling parameters (for example, the discrete resource mapping information, a modulation and coding scheme, and the multi-stream transmission indication information), and the terminal may configure an uplink channel based on these parameters, to send the data to the network device.

It should be noted that the network device may dynamically configure a waveform of the terminal by repeatedly performing steps 603 and 604. For descriptions of waveform configuration overwriting or replacement, refer to descriptions in Embodiment 3. Details are not described herein again.

In this embodiment, the network device flexibly controls a waveform of the terminal, so that the terminal can transmit uplink data by using an appropriate waveform, thereby improving user experience. In addition, the network device may send the waveform and the scheduling information through one interaction, so as to reduce overheads of communication between the terminal and the network device.

Embodiment 6

An embodiment of the present invention provides still another control information processing method and a network device and a terminal based on the method. This embodiment is applicable to a scenario in which the terminal randomly accesses a wireless network. In this embodiment, the network device transmits scheduling information to the terminal through a PDSCH. It should be noted that in this embodiment, the scheduling information is sent by using a signaling message (namely, a MAC CE) at a MAC layer.

Figure 7:
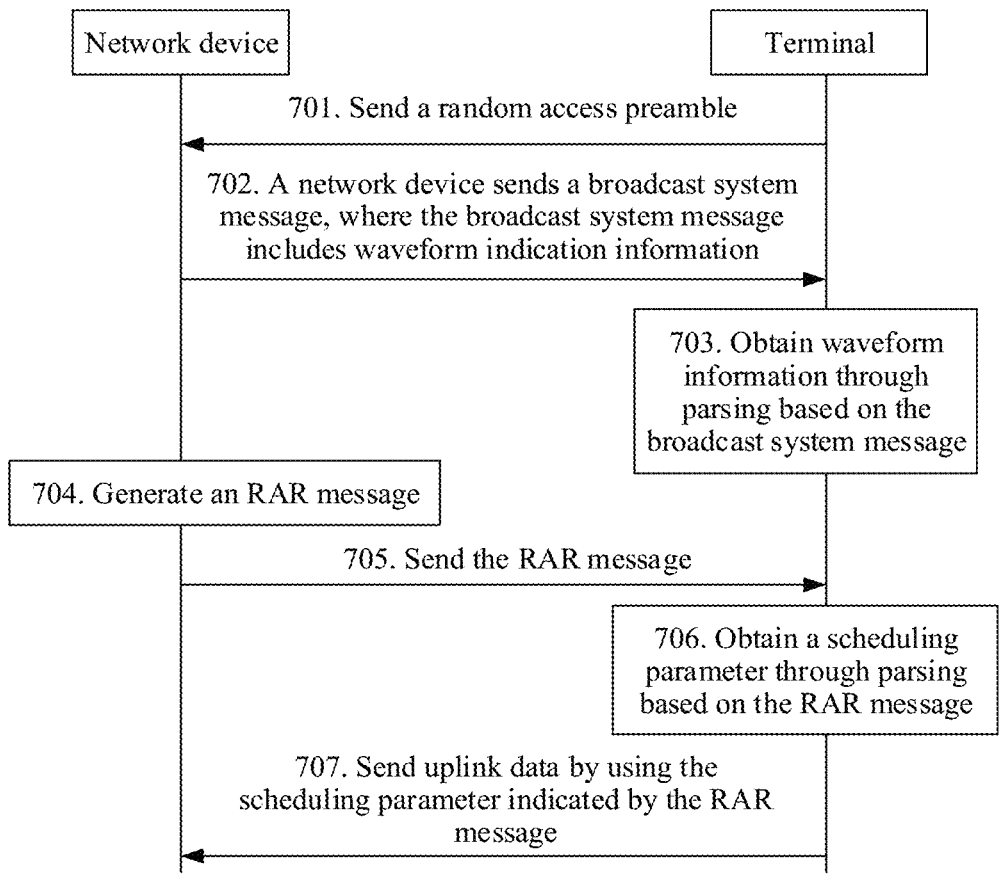
FIG. 7 is a schematic communication diagram of still another type of control information processing according to an embodiment of the present invention.

The following describes this embodiment of the present invention in detail with reference to FIG. 7.

701. The terminal sends a random access preamble.

Specifically, the terminal sends the random access preamble information to the network device, to indicate that the terminal wants to perform radio access communication with the network device.

702. The network device sends a broadcast system message, where the broadcast system message includes waveform indication information.

After receiving the random access preamble sent by the terminal, the network device performs this step when determining that the terminal can communicate with the network device. This step is similar to step 301 in Embodiment 2. A difference lies in that in this step in this embodiment, a broadcast system message at an RRC layer needs to be used. Specifically, 1-bit waveform indication information may be added to an existing message or a newly defined message, to transmit the waveform indication information.

703. The terminal obtains waveform information through parsing based on the broadcast system message.

Specifically, the terminal needs to obtain, through parsing based on the received broadcast system message, the waveform information that is configured by the network device for the terminal for uplink transmission.

704. The network device generates a random access response (RAR) message.

Specifically, the RAR message needs to include a scheduling parameter that needs to be used to instruct the terminal to transmit uplink data. The RAR message corresponds to one or more of a plurality of uplink transmission waveforms. It should be noted that because the waveform information has been transmitted to the terminal in step 702, to simplify a processing procedure of the terminal, two scheduling parameter formats may be defined to respectively indicate different waveforms (for example, an OFDM waveform and a DFT-S-OFDM waveform). Because the terminal has known waveform configuration information, after the terminal receives the RAR message, the terminal may directly perform parsing based on a scheduling parameter format corresponding to the known waveform. For example, a scheduling parameter format that includes consecutive resource mapping, a modulation and coding scheme, and FDSS indication information may correspond to the DFT-S-OFDM waveform, and discrete resource mapping, the modulation and coding scheme, and a power control instruction may be used to represent the OFDM waveform. Alternatively, a general format may be defined to correspond to the two waveforms. In this case, regardless of a waveform that is to be used, the terminal may obtain the scheduling parameter through parsing based on the format, so as to greatly simplify a processing procedure of the terminal.

705. The network device sends the RAR message.

Specifically, the network device sends the RAR message to the terminal through a PDSCH.

706. The terminal obtains scheduling information through parsing based on the RAR message.

707. The terminal sends uplink data by using the scheduling information indicated by the RAR message.

Specifically, in the two steps, after receiving the RAR message, the terminal obtains the scheduling parameter included in the message through parsing, so as to transmit the uplink data based on the scheduling parameter and the waveform obtained in the foregoing step.

In this embodiment, the network device flexibly controls a waveform of the terminal, so that the terminal can transmit uplink data by using an appropriate waveform, thereby improving user experience. In addition, when the terminal has known the waveform, the terminal only needs to detect a small quantity of DCI formats, so as to simplify related processing and operations of the terminal.

The solutions provided in the embodiments of the present invention are mainly described above from a perspective of interaction between devices. It can be understood that to implement the foregoing functions, the devices, namely, the network device and the terminal include corresponding hardware structures and/or software modules for implementing the functions. A person of ordinary skill in the art should easily be aware that, in combination with the examples of units and steps described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Embodiment 7

Figure 8:
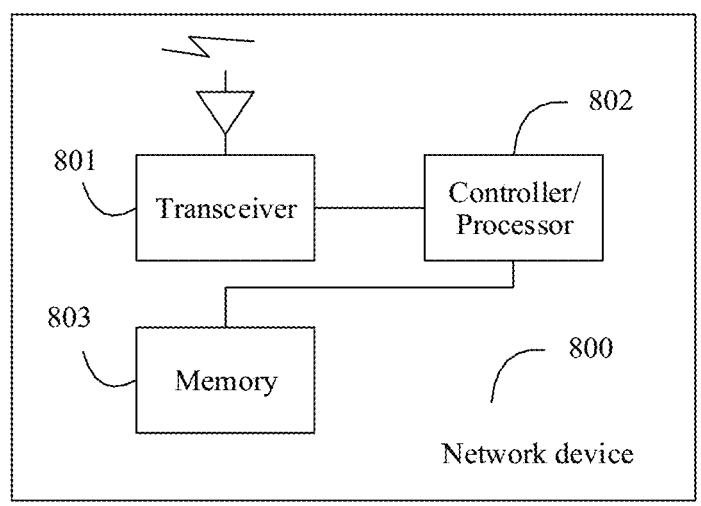
FIG. 8 is a schematic structural diagram of a network device according to an embodiment of the present invention.

FIG. 8 is a possible schematic structural diagram of a network device in the foregoing method embodiments. The network device 800 includes a memory 803, a controller/processor 802, and a transceiver 801.

The memory 803 is configured to store program code that may be executed by the controller/processor.

The controller/processor 802 is configured to read and execute the program code stored in the memory 803, to perform the steps that are described in the foregoing method embodiment and that are performed by the network device, for example, the related step of generating one or more pieces of control information described in the foregoing methods. For details, refer to related descriptions of the network device in Embodiment 1 to Embodiment 6. Details are not described herein again.

The transceiver 801 is configured to support the step of sending and receiving information between the network device and the terminal described in the foregoing method embodiments, for example, the step of receiving various messages/information sent by the terminal, or the step of sending various pieces of information/messages to the terminal. For details, refer to related descriptions of the network device in Embodiment 1 to Embodiment 6. Details are not described herein again.

It may be understood that FIG. 8 merely shows a simplified design of the network device. In actual application, the network device may include any quantity of transceivers, processors, controllers, memories, communications units, and the like, and all network devices that can implement the present invention shall fall within the protection scope of the present invention.

Figure 9:
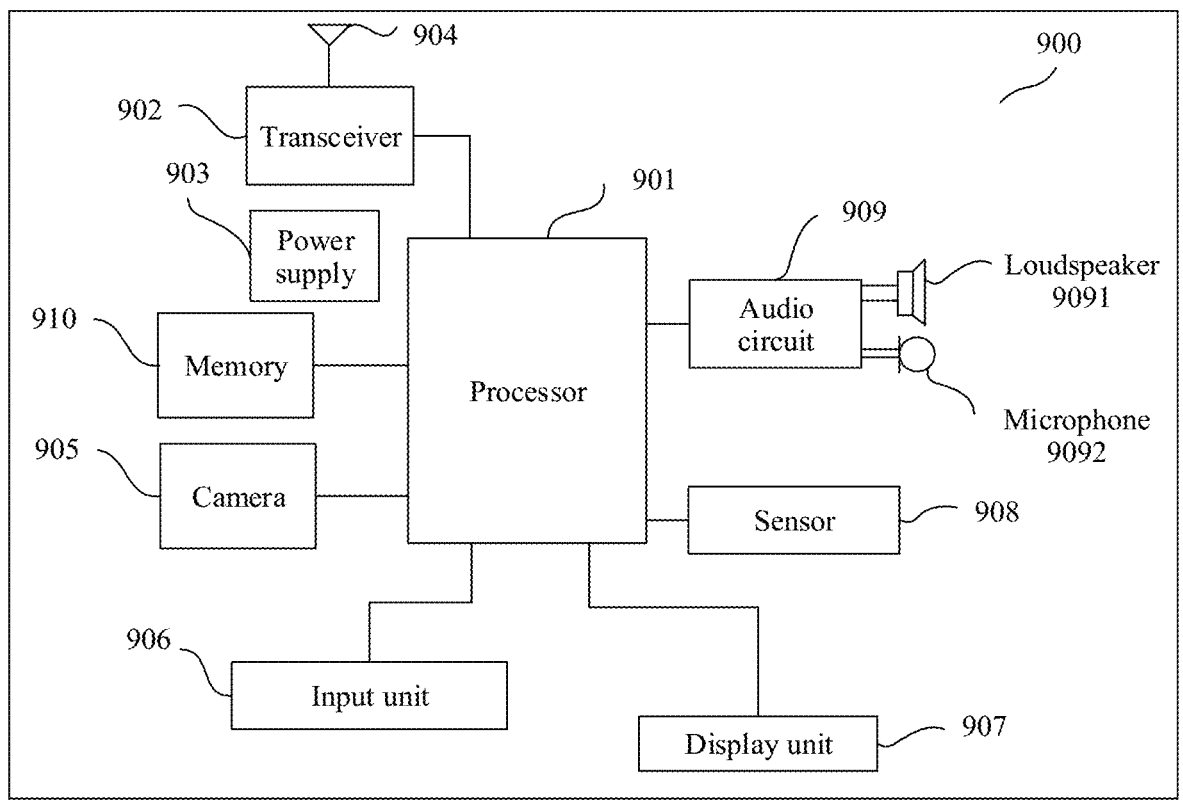
FIG. 9 is a schematic structural diagram of a terminal according to an embodiment of the present invention.

FIG. 9 is a simplified schematic diagram of a possible design structure of a terminal in the foregoing embodiments. The terminal device 900 includes a processor 901 and a transceiver 902.

The processor 901 is configured to perform the steps/actions that are described in the foregoing method embodiments and that are performed by the terminal, for example, to perform the related step that is described in the foregoing methods and in which a waveform used to transmit uplink data is obtained based on one or more pieces of control information. For details, refer to descriptions in the foregoing method embodiments. Details are not described herein again.

The transceiver 902 is configured to support the step of sending and receiving information between the terminal and the network device described in the foregoing method embodiments, for example, the step of receiving various messages/information sent by the network device, or the step of sending various pieces of information/messages to the network device. For details, refer to descriptions in the foregoing method embodiments. Details are not described herein again.

Optionally, the terminal 900 may further include a memory 910, configured to store program code that may be executed by the processor, so that the processor can implement, based on the program code stored in the memory 910, the actions performed by the terminal in the foregoing embodiments. The processor 901 and the memory 910 may be integrated into a processing apparatus. In other words, in a specific implementation, the memory 910 may be integrated into the processor 901.

As shown in FIG. 9, the terminal 900 may further include a power supply 903, configured to supply power to various components or circuits in the terminal. The terminal may further include an antenna 904, configured to send, by using a radio signal, uplink data output by the transceiver, or output a received radio signal to the transceiver. In addition, to implement more functions of the terminal, the terminal may further include one or more of an input unit 906, a display unit 907, an audio circuit 909, a camera 905, a sensor 908, and the like. The audio circuit 909 may include a loudspeaker 9091, a microphone 9092, and the like.

An embodiment of the present invention further provides a chip into which a circuit used to implement functions of the foregoing processor 901 is integrated. When the foregoing memory 910 is integrated into the chip, the chip is connected to the transceiver 902 through an interface, to send a message/information/data mentioned in the foregoing method embodiments to a network device through the interface, or receive, from the interface, a message/information/data sent by the network device. When the foregoing memory 910 is not integrated into the chip, the chip may be connected to an external memory and the transceiver through an interface. The chip implements, based on program code stored in the external memory, the actions performed by the terminal in the foregoing embodiments, and sends and receives the data/message/information by using the transceiver connected to the chip. The functions supported by the chip may include the internal actions of the terminal that are mentioned in Embodiment 1 to Embodiment 6. Details are not described herein again.

It should be noted that the processor shown in FIG. 8 and FIG. 9 may be one processing unit, or may be a collective term of a plurality of processing units. For example, the processor may be a central processing unit (CPU), or may be an application-specific integrated circuit (ASIC), or may be configured as one or more integrated circuits for implementing this embodiment of the present invention, for example, one or more microprocessors (DSP) or one or more field programmable gate arrays (FPGA).

The memory may be a storage apparatus, or may be a collective term of a plurality of storage elements, and is configured to store executable program code, or a parameter, data, or the like that needs to be used by a residential access network device or a terminal for running. The memory may include a random-access memory (RAM), or may include a non-volatile memory (NVM) such as a disk memory or a flash.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

Although preferred embodiments of the present invention have been described, a person skilled in the art can make changes and modifications to these embodiments once they learn of the basic inventive concept. Therefore, the following claims are intended to be construed as to cover the preferred embodiments and all changes and modifications falling within the scope of the present invention.

Apparently, a person skilled in the art can make various modifications and variations to the present invention without departing from the spirit and scope of the present invention. The present invention is intended to cover these modifications and variations provided that they fall within the scope of protection defined by the following claims and their equivalent technologies.

The invention claimed is:

1. A control information sending method, wherein the method comprises:
generating, by a network device, first control information, wherein the first control information comprises first information indicating two uplink transmission waveforms, wherein the two uplink transmission waveforms are configured by the network device for a terminal to transmit uplink data to the network device, wherein the first control information is insufficient for the terminal to determine, from the two uplink transmission waveforms, a waveform used to transmit the uplink data to the network device, and wherein the two uplink transmission waveforms indicated by the first control information are an orthogonal frequency division multiplexing (OFDM) waveform and a discrete Fourier transform-spread orthogonal frequency division multiplexing (DFT-S-OFDM) waveform;
sending, by the network device, the first control information to the terminal;
generating, by the network device, second control information, wherein the second control information comprises second information indicating the terminal to use a particular uplink transmission waveform of the two uplink transmission waveforms comprised in the first control information; and
sending, by the network device, the second control information to the terminal.

2. The method according to claim 1, wherein the first control information is radio resource control (RRC) signaling, and the second control information is downlink control information (DCI).

3. The method according to claim 1, wherein the first control information is used to indicate the waveform used when the terminal transmits the uplink data for one time or for a plurality of times.

4. The method according to claim 1, wherein the first information is transmission mode (TM) information, modulation and coding scheme (MCS) information or waveform and power control mixed information.

5. The method according to claim 1, wherein the second information is at least one piece of power control information, and a cumulative power offset of the at least one piece of power control information is used by the terminal to determine a waveform.

6. A control information receiving method, wherein the method comprises:
receiving, by a terminal, first control information sent by a network device, wherein the first control information comprises first information indicating two uplink transmission waveforms, wherein the two uplink transmission waveforms are configured by the network device for the terminal to transmit uplink data to the network device, wherein the first control information is insufficient for the terminal to determine, from the two uplink transmission waveforms, a waveform used to transmit the uplink data to the network device, and wherein the two uplink transmission waveforms indicated by the first control information are an orthogonal frequency division multiplexing (OFDM) waveform and a discrete Fourier transform-spread orthogonal frequency division multiplexing (DFT-S-OFDM) waveform;
receiving, by the terminal, second control information sent by the network device, wherein the second control information comprises second information indicating the terminal to use a particular uplink transmission waveform of the two uplink transmission waveforms comprised in the first control information; and
determining, by the terminal based on the first control information and the second control information, the particular uplink transmission waveform as the waveform used to transmit the uplink data to the network device.

7. The method according to claim 6, wherein the first control information is radio resource control (RRC) signaling, and the second control information is downlink control information (DCI).

8. The method according to claim 6, wherein the first control information is used to indicate the waveform used when the terminal transmits the uplink data for one time or for a plurality of times.

9. The method according to claim 6, wherein the first information is transmission mode (TM) information, modulation and coding scheme (MCS) information or waveform and power control mixed information.

10. The method according to claim 6, wherein the second control information is downlink control information (DCI), and a length of the DCI indicates at least one uplink transmission waveform, or the DCI comprises one piece of waveform indication information.

11. The method according to claim 6, wherein the second information is at least one piece of power control information, and a waveform of the terminal is determined by using both a cumulative power offset of the at least one piece of power control information and a power value set by the terminal.

12. A network device, wherein the network device comprises at least one processor, one or more memories, and a transmitter, and wherein the one or more memories stores programming instructions for execution by the at least one processor to:
generate first control information, wherein the first control information comprises first information indicating two uplink transmission waveforms, wherein the two uplink transmission waveforms are configured by the network device for a terminal to transmit uplink data to the network device, wherein the first control information is insufficient for the terminal to determine, from the two uplink transmission waveforms, a waveform used to transmit the uplink data to the network device, and wherein the two uplink transmission waveforms indicated by the first control information are an orthogonal frequency division multiplexing (OFDM) waveform and a discrete Fourier transform-spread orthogonal frequency division multiplexing (DFT-S-OFDM) waveform;
send, using the transmitter, the first control information to the terminal;
generate second control information, wherein the second control information comprises second information indicating the terminal to use a particular uplink transmission waveform of the two uplink transmission waveforms comprised in the first control information; and
send, using the transmitter, the second control information to the terminal.

13. The network device according to claim 12, wherein the first control information is radio resource control (RRC) signaling, and the second control information is downlink control information (DCI).

14. A terminal, comprising a receiver, one or more memories, and at least one processor, wherein:
the receiver is configured to:
receive first control information sent by a network device, wherein the first control information comprises first information indicating two uplink transmission waveforms, wherein the two uplink transmission waveforms are configured by the network device for the terminal to transmit uplink data to the network device, wherein the first control information is insufficient for the terminal to determine, from the two uplink transmission waveforms, a waveform used to transmit the uplink data to the network device, and wherein the two uplink transmission waveforms indicated by the first control information are an orthogonal frequency division multiplexing (OFDM) waveform and a discrete Fourier transform-spread orthogonal frequency division multiplexing (DFT-S-OFDM) waveform; and
receive second control information sent by the network device, wherein the second control information comprises second information indicating the terminal to use a particular uplink transmission waveform of the two uplink transmission waveforms comprised in the first control information; and
the one or more memories stores programming instructions for execution by the at least one processor to determine, based on the first control information and the second control information, the particular uplink transmission waveform as the waveform used to send the uplink data.

15. The terminal according to claim 14, wherein the first control information is radio resource control (RRC) signaling, and the second control information is downlink control information (DCI).

16. The method according to claim 1, wherein the second control information is radio resource control (RRC) signaling or a media access control-control element (MAC CE).

17. The method according to claim 6, wherein the second control information is radio resource control (RRC) signaling or a media access control-control element (MAC CE).

18. The network device according to claim 12, wherein the second control information is radio resource control (RRC) signaling or a media access control-control element (MAC CE).

19. The method according to claim 1, wherein the terminal is unable to determine the waveform to send the uplink data based on the first information without the second information.

20. A control information sending method, wherein the method comprises:
generating, by a network device, first control information, wherein the first control information comprises first information indicating two uplink transmission waveforms, wherein the two uplink transmission waveforms are configured by the network device for a terminal to transmit uplink data to the network device, and wherein the two uplink transmission waveforms indicated by the first control information are an orthogonal frequency division multiplexing (OFDM) waveform and a discrete Fourier transform-spread orthogonal frequency division multiplexing (DFT-S-OFDM) waveform;
sending, by the network device, the first control information to the terminal;
generating, by the network device, second control information, wherein the second control information comprises second information indicating the terminal to use a particular uplink transmission waveform of the two uplink transmission waveforms comprised in the first control information, the second control information is downlink control information (DCI), and a length of the DCI indicates at least one uplink transmission waveform; and
sending, by the network device, the second control information to the terminal.

* * * * *